United States Patent Office 2,829,148
Patented Apr. 1, 1958

2,829,148

PURIFICATION OF CYANIDES OF TRIARYLMETHANE DYES

Lyman Chalkley, Washington, D. C.

No Drawing. Application December 15, 1955
Serial No. 553,183

11 Claims. (Cl. 260—391)

The present invention relates to the purification of cyanides of triarylmethane dyes, and more particularly, to the purification of cyanides of di- and tri-primary amino triarylmethane dyes.

The triarylmethane dyes are highly colored compounds having at least one auxochromic group, such as an amino or hydroxyl group, at a position para to the central methane carbon atom. The cyanides of these dyes are colorless, or nearly colorless, but are photosensitive when, in the presence of a suitable activator, they are irradiated with ultra-violet and shorter wave lengths and the original highly colored dye is regenerated. This makes these dye cyanides of great value in actinometry and for photographic and photoduplication processes.

The preparation of the cyanides of triarylmethane dyes by treatment of the dye with a soluble ionized cyanide is known. The dye cyanides formed by this process are necessarily contaminated by the original dye and by dye base (carbinol) formed by hydrolysis of the dye in the presence of alkali in the reaction medium.

For use in photosensitive systems, it is necessary that the dye cyanides be relatively free from dyes and dye bases. Since a dye base has a structure and often chemical properties that are quite similar to the cyanide of the same dye, separation of the two may require repeated recrystallization of the crude dye cyanide obtained by the action of an alkali cyanide on a dye. Some of the dye cyanides, such as that of malachite green, are relatively soluble in conventional organic solvents used for this purpose and can be recrystallized efficiently without the use of large quantities of solvent and the handling of large volumes of solutions. However, certain other triarylmethane dye cyanides are relatively insoluble in such solvents, making their purification extremely difficult.

For example, Pararosaniline cyanide is quite difficultly soluble in the usual recrystallizing solvents. L. C. Joffe, "Photochemische Studien in der Triphenylmethanreihe" (Dissertation, Zurich, 1921), pp. 36-37 recrystallized this dye cyanide from alcohol, but found that the crude product had to be extracted 15 to 20 times with hot alcohol to get it into solution, and that the whole recrystallization process had to be repeated 2 to 3 times in order to obtain a pure product. This requires liters of alcohol and expensive equipment to handle this volume and put it through the additional operations of heating and cooling. However, this is the best method of purification of this type of crude dye cyanide reported in the literature.

The di-and tri-primaryamino triarylmethane dye cyanides are, as a class, difficultly soluble in most organic solvents and examples of such dye cyanides are Rosaniline cyanide, the cyanide of Colour Index No. 677, Pararosaniline cyanide, the cyanide of Colour Index No. 676, and New Fuchsine cyanide, the cyanide of Colour Index No. 678.

It is the primary object of the present invention to provide a process for purifying sufficiently for photochemical use, a crude triarylmethane dye cyanide having at least two primaryamino groups para to the central methane carbon atom by a single recrystallization from a relatively small volume of solution.

A further object of the invention is to provide a process for purifying di- and tri-primaryamino triarylmethane dye cyandies which is readily and economically carried out with a minimum of equipment and which results in a good yield of substantially pure crystalline dye cyanide.

Other objects of the invention will be apparent from the following detailed description of the invention.

I have discovered that very surprisingly the di- and tri-primaryamino triarylmethane dye cyanides are, as a class, quite soluble in triethyl phosphate, often being as much as 2,000 times more soluble in this solvent than in ethyl alcohol, and that the cyanides may be precipitated in substantially pure crystalline form from solution in this solvent. Moreover, triethyl phosphate apparently has the effect of converting dye carbinol, which, as has been pointed out, often has properties very similar to the corresponding dye cyanide, to the more easily separated original dye.

The usual method of recrystallization by cooling a hot concentrated solution is not applicable to solutions of the cyanides of di- and tri-primaryamino triarylmethane dyes in triethyl phosphate because the cyanides are little more soluble at 100° C. than at room temperature in this solvent. However, they may be precipitated in substantially pure form by the addition of a suitable amount of water.

Some of the literature presents conflicting data on the solubility characteristics of triethyl phosphate. For example, the 36th edition of the "Handbook of Chemistry and Physics" (Chemical Rubber Publishing Company, Cleveland, Ohio, 1954) on pages 924–5 indicates that 100 ml. of water will dissolve only 100 g. at 25° C., and that the triethyl phosphate is decomposed by water. On pages 1386–7 of the same handbook it is indicated that triethyl phosphate is miscible with water with no suggestion of decomposition. I have found the latter data to be correct under the conditions in which I use triethyl phosphate.

The crude dye cyanide goes readily into solution in the triethyl phosphate at room temperature with stirring, although the solution may be heated to obtain what little advantage may be gained. It is preferred that the solution of crude dye cyanide be concentrated since substantialy pure, crystalline dye cyanide can be precipitated from such a solution and the overall volume of solvent used to purify a given amount of crude dye cyanide will be less the more concentrated the solution. The concentration of the triethyl phosphate solution, however, is not critical in the process.

Solutions of the present dye cyanides in triethyl phosphate have a peculiarity which may be used to advantage in this method of purifying them. While the cyanides are virtually insoluble in pure water, they may be more soluble in a mixture of critical proportions of triethyl phosphate and water than in pure triethyl phosphate. This is particularly true of New Fuchsine cyanide and a real advantage may be obtained in this case by initially dissolving the crude dye cyanide in a mixture of triethyl phosphate and up to 40% of water based on the volume of the solution and in that way obtain a more concentrated solution of crude dye cyanide.

The amount of water to be added to precipitate the dye cyanide from solution is not critical and will vary in accordance with such factors as the relative ease of precipitation of the particular di- or tri-primaryamino triaryl methane dye cyanide being purified, whether triethyl phosphate, alone, or a mixture of this solvent and water was used to dissolve the crude dye cyanide, and the purity required of the final product. In general, when liquid water is added, its amount will be ½ to 10 volumes based on the volume of the original triethyl phosphate solution.

The dye cyanide will, of course, be precipitated regardless of how rapidly the water is added. However, if the water is added very rapidly the dye cyanide is likely to be precipitated initially as a tar (even though this may crystallize on standing) and to carry down with it dye that would have remained in solution if the precipitate had been produced initially in a crystalline form. The preferred rate for adding water, based on volume of the original dye cyanide as unity, is 1/200 volume of water per hour to 1/2 volume of water per hour. The slower rates of addition give the larger and purer crystals. For best results, the solution should be stirred while the water is being added.

One preferred method is to add slowly a relatively small proportion of water and obtain a first crop of large, easily separated crystals of very pure dye cyanide and then to add more water rapidly to the mother liquor to obtain a second crop of less pure product.

The precipitated crystalline dye cyanide may be separated by any suitable means, for example, by filtering. The separated material may be washed with hot water and dried in the usual manner.

Any solid impurities which separate during the initial dissolving of the crude dye cyanide should be separated as by filtration.

Although the process is relatively slow, the fact that triethyl phosphate is hygroscopic can be used to obtain the cyanides of di- and tri-primaryamino triarylmethane dyes in the form of very large and very pure crystals. A solution, preferably concentrated, of the crude dye cyanide in triethyl phosphate is placed in a closed space containing liquid water which vaporizes as water vapor is absorbed by the solution. The pressure in the closed system is not critical, and may range from the combined pressure of the water and triethyl phosphate up to atmospheric. However, the precipitation proceeds most rapidly at lower pressures, and even at that supplied by the two liquids alone is slow enough to give good crystals. The preferred range of pressure at 25° C. is from approximately 2.5 cm. of mercury to 50 cm. of mercury.

At higher temperatures the reciprocal distillation of water and triethyl phosphate in a closed system is rapid, though the temperature is not critical. For convenience and for the growth of large crystals I prefer to use a temperature within the range of 15° to 45° C. and to hold the temperature constant within plus or minus 5° C.

The amount of water added as vapor in a closed system, preferably under reduced pressure, is best expressed in terms of the liquid water placed in the system and may vary from 1 to 20 volumes of water based on the volume of the original triethyl phosphate solution. In this case the volume of the triethyl phosphate solution always increases with absorption of water vapor, often as much as 40%. However, the increase in volume in a closed system is not a true measure of the quantity of water added because the triethyl phosphate also distills into the water reservoir. Thus at the end there is less triethyl phosphate than originally present in the dye cyanide solution and there is more water than the increase in volume would indicate. The increase in volume is a difference between the water added and the triethyl phosphate withdrawn. The precipitation in this case has a dual cause, (1) the addition of water, and (2) the evaporation of triethyl phosphate.

The time of action of the water and dye cyanide solution upon each other in a closed system is adjusted to give a good yield of product and varies enormously with the pressure within the system and the temperature, and to a lesser extent with the ratio of the volumes of solution and of water. For example, at 25° C. and 5 cm. pressure a few weeks gives a good yield of p-rosaniline cyanide when 3 to 5 volumes of water are used to 1 volume of the initial dye cyanide solution.

The following examples, which must be carried out in the absence of ultra-violet radiation because the triethyl phosphate is a photoactivator for the tye cyanides, are presented as illustrative of the invention.

*Example 1.—Purification of New Fuchsine cyanide, the cyanide of Colour Index No. 678*

Ten g. of dry, crude New Fuchsine cyanide, prepared by the reaction of the dye with sodium cyanide in aqueous solution, is put in a 400 ml. beaker with 75 ml. of triethyl phosphate and 25 ml. of water and brought into solution at 25° C. by stirring. Solution is complete in a few minutes. The solution is filtered, returned to its beaker and treated with water added slowly at 2 ml. per hour while the solution is stirred. After 100 ml. of water has been added the nearly colorless crystalline powder is collected on a filter, washed with water and air dried. This is pure enough for use in photosensitive preparations. A second crop of slightly less pure material may be obtained by treatment of the mother liquor with 700 ml. more water added all at once.

*Example 2.—Purification of pararosaniline cyanide, the cyanide of Colour Index No. 676*

Twenty g. of Pararosaniline cyanide, crude as obtained by reaction of the dye with sodium cyanide, is dissolved at 100° C. in 160 ml. of triethyl phosphate. This solution in a 500 ml. beaker is put in a large vacuum desiccator, the bottom of which is filled with 500 ml. of water. The desiccator is closed, evacuated to an internal pressure of 5 cm. of mercury, and allowed to stand in the dark at room temperature for from 4 to 6 weeks. In this time the volume of the solution has increased with absorption of water vapor and large crystals, 2 to 3 mm. on a side, have formed. These are collected, washed with water and dried in vacuo over sulfuric acid.

*Example 3.—Purification of Rosaniline cyanide, the cyanide of Colour Index No. 677*

To 50 ml. of triethyl phosphate is added 15 g. of powdered crude Rosaniline cyanide. The mixture is stirred at 16° C. for 1/2 hour and the solution then filtered from a residue of about 1.4 g. of undissolved material. The clear, strongly colored filtrate is slowly stirred in a beaker at room temperature while 100 ml. of water is added at the rate of 3 ml. per hour. The precipitate of substantially pure, crystalline Rosaniline cyanide is then collected on a filter, washed with water until the wash water is colorless, and dried in a 110° C. oven.

I claim:

1. The method of purifying crude triphenylmethane dye cyanides having at least two primary amino groups para to the central methane carbon atom, comprising dissolving said crude dye cyanide in a solvent comprising triethyl phosphate, diluting the solution so formed with water to precipitate purified dye cyanide therefrom, and separating said precipitated dye cyanide from said solution.

2. The method of claim 1 in which there is added 1/2 to 10 volumes of water based on the volume of the original triethyl phosphate solution.

3. The method of claim 1 in which said dye cyanide is the cyanide of Rosaniline, Colour Index No. 677.

4. The method of claim 1 in which said dye cyanide is the cyanide of Pararosaniline, Colour Index No. 676.

5. The method of claim 1 in which said dye cyanide is the cyanide of New Fuchsine, Colour Index No. 678.

6. The method of purifying crude cyanide New Fuchsine, Colour Index No. 678, comprising dissolving said crude cyanide in a mixture of triethyl phosphate and no more than 40% of water based on the volume of said solution, diluting the solution so formed with water to precipitate purified New Fuchsine cyanide therefrom, and separating said precipitated dye cyanide from said solution.

7. The method of purifying crude triphenylmethane dye cyanides having at least two primary amino groups para to the central methane carbon atom, comprising placing a solution of said crude dye cyanide in triethyl phosphate in a closed space in the presence of liquid water so that said liquid water forms water vapor which is absorbed by said triethyl phosphate solution to precipitate purified, crystalline dye cyanide therefrom; and separating said precipitated dye cyanide from said solution.

8. The method of claim 7 in which the pressure in the closed system is from approximately 2.5 cm. of mercury to 50 cm. of mercury.

9. The method of claim 8 in which said dye cyanide is the cyanide of Rosaniline, Colour Index No. 677.

10. The method of claim 8 in which said dye cyanide is the cyanide of Pararosaniline, Colour Index No. 676.

11. The method of claim 8 in which said dye cyanide is the cyanide of New Fuchsine, Colour Index No. 678.

References Cited in the file of this patent

UNITED STATES PATENTS 36,356　　Monnet ---------------- Sept. 2, 1862

OTHER REFERENCES

The Condensed Chemical Dictionary, 3rd edition, 1942, p. 644, col. 2.